US010536456B2

(12) United States Patent
Wang et al.

(10) Patent No.: US 10,536,456 B2
(45) Date of Patent: Jan. 14, 2020

(54) METHOD AND SYSTEM FOR IDENTIFYING USER INFORMATION IN SOCIAL NETWORK (71) Applicant: TENCENT TECHNOLOGY (SHENZHEN) COMPANY LIMITED, Shenzhen, Guangdong (CN)

(72) Inventors: Haiyang Wang, Shenzhen (CN); Zixuan Zhao, Shenzhen (CN); Jiwei Guo, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 147 days.

(21) Appl. No.: 15/712,398

(22) Filed: Sep. 22, 2017

(65) Prior Publication Data
US 2018/0077157 A1 Mar. 15, 2018

Related U.S. Application Data (63) Continuation of application No. PCT/CN2016/090277, filed on Jul. 18, 2016.

(30) Foreign Application Priority Data

Oct. 9, 2015 (CN) .......................... 2015 1 0647120

(51) Int. Cl.
*H04L 29/06* (2006.01)
*H04L 29/08* (2006.01)
(Continued)

(52) U.S. Cl.
CPC ...... *H04L 63/0876* (2013.01); *G06F 16/2365* (2019.01); *G06F 16/2465* (2019.01);
(Continued)

(58) Field of Classification Search
CPC .............. G06F 16/955; G06F 16/2465; G06F 16/2365; G06F 16/951; G06F 2216/03; H04L 63/0815; H04L 67/22
See application file for complete search history.

(56) References Cited

U.S. PATENT DOCUMENTS 7,987,501 B2 * 7/2011 Miller ................. H04L 63/0815
713/182
8,826,122 B2 * 9/2014 Ruan ....................... H04L 67/04
715/234
(Continued)

FOREIGN PATENT DOCUMENTS

CN 1866822 A 11/2006
CN 103118043 A * 5/2013
(Continued)

OTHER PUBLICATIONS

Internal Search Report for PCT/CN2016/090277, dated Oct. 10, 2016.

*Primary Examiner* — Yonas A Bayou
(74) *Attorney, Agent, or Firm* — Sughrue Mion, PLLC (57) ABSTRACT A method for identifying user information includes obtaining a first user identifier of a user in a social network; obtaining identity authentication information corresponding to the first user identifier; determining whether the identity authentication information is associated with a second user identifier; and storing, when the identity authentication information is associated with the second user identifier, an association relationship between the first user identifier and the second user identifier.

20 Claims, 5 Drawing Sheets (51) Int. Cl.
 *G06F 17/30* (2006.01)
 *G06F 16/951* (2019.01)
 *G06F 16/955* (2019.01)
 *G06F 16/23* (2019.01)
 *G06F 16/2458* (2019.01)

(52) U.S. Cl.
 CPC ......... *G06F 16/951* (2019.01); *G06F 16/955* (2019.01); *H04L 67/22* (2013.01); *G06F 2216/03* (2013.01)

(56) References Cited

U.S. PATENT DOCUMENTS

| | | | | |
|---|---|---|---|---|
| 8,856,894 B1* | 10/2014 | Dean | ........................ | H04L 63/08 |
| | | | | 713/175 |
| 9,477,737 B1* | 10/2016 | Charyk | ................... | G06F 16/27 |
| 9,537,966 B2* | 1/2017 | Liu | ......................... | H04L 67/26 |
| 9,542,553 B1* | 1/2017 | Burger | ................. | H04L 63/1425 |
| 10,021,099 B2* | 7/2018 | Eisen | ..................... | H04W 12/08 |
| 10,089,679 B2* | 10/2018 | Eisen | .................. | H04L 63/0876 |
| 10,091,312 B1* | 10/2018 | Khanwalkar | ............ | H04L 67/22 |
| 2006/0156389 A1* | 7/2006 | Brown | ................. | G06F 21/552 |
| | | | | 726/5 |
| 2007/0192122 A1* | 8/2007 | Routson | ................. | G06Q 30/02 |
| | | | | 705/1.1 |
| 2009/0217366 A1 | 8/2009 | Gao et al. | | |
| 2014/0099922 A1* | 4/2014 | Cazanas | ................. | H04L 67/20 |
| | | | | 455/411 |

FOREIGN PATENT DOCUMENTS

| | | |
|---|---|---|
| CN | 103118043 A | 5/2013 |
| CN | 104574192 A | 4/2015 |
| CN | 103118043 B * | 12/2015 |

\* cited by examiner

METHOD AND SYSTEM FOR IDENTIFYING USER INFORMATION IN SOCIAL NETWORK

CROSS-REFERENCE TO RELATED APPLICATIONS

This application is a bypass continuation application of International Application No. PCT/CN2016/090277, filed on Jul. 18, 2016 in the Chinese Patent Office, which claims priority from Chinese Patent Application No. 201510647120.5, filed on Oct. 9, 2015 in the Chinese Patent Office and entitled "IDENTIFICATION METHOD AND SYSTEM FOR USER INFORMATION IN SOCIAL NETWORK," the disclosure of which is incorporated herein by reference in its entirety.

BACKGROUND

1. Field

Methods and systems consistent with exemplary embodiments relate to communications technologies, and more particularly, to methods and systems for identifying user information in a social network.

2. Description of the Related Art

With the development of Internet technologies, various social networks become popular. In a social network, it is common that one user has multiple accounts for various reasons. Therefore, there is a need to identify, manage, and use the multiple accounts of the user.

In the related art technology, offline data, for example, behavior data of users, is usually collected, and analysis and mining are performed on the data, to identify relationships between the users and the accounts. For example, an account A and an account B may belong to a first user who is named as Zhang San, and an account C, an account D, and an account E may belong to a second user who is named as Li Si.

SUMMARY

One or more exemplary embodiments provide an identification method and system for user information in a social network, so that resource consumption is reduced, the identification efficiency is improved, and the accuracy of user information identification can also be improved.

According to an aspect of an exemplary embodiment, there is provided a method for identifying user information, the method performed by at least one computer processor and including: obtaining a first user identifier of a user in a social network; obtaining identity authentication information corresponding to the first user identifier; determining whether the identity authentication information is associated with a second user identifier; and storing, when the identity authentication information is associated with the second user identifier, an association relationship between the first user identifier and the second user identifier.

The storing may include identifying a record item by using the first user identifier as a keyword, and recording, in the record item, the second user identifier and the identity authentication information corresponding to the first user identifier.

The storing may include determining whether the association relationship between the first user identifier and the second user identifier is stored in an identity information relationship database; and storing the association relationship between the first user identifier and the second user identifier, when it is determined that the association relationship between the first user identifier and the second user identifier is not stored in the identity information relationship database.

The storing the association relationship may include storing the association relationship in the identity information relationship database.

The association relationship may include a master-slave relationship between the first user identifier and the second user identifier, the method further including performing at least one of: obtaining a preset rule, and determining the master-slave relationship between the first user identifier and the second user identifier based on the preset rule; and receiving indication information of the user, and determining the master-slave relationship between the first user identifier and the second user identifier based on the indication information.

The obtaining the identity authentication information corresponding to the first user identifier may include querying a preset identity authentication system by using the first user identifier as a keyword; determining whether the identity authentication information corresponding to the first user identifier exists in the identity authentication system; and obtaining the identity authentication information when it is determined that the identity authentication information exists in the identity authentication system.

The method may further include collecting identity authentication information of users in the social network; and managing the identity authentication system based on the collected identity authentication information.

The method may further include verifying accuracy of data mining on a user behavior based on the stored association relationship between the first user identifier and the second user identifier.

The method may further include obtaining first user behavior data corresponding to the first user identifier and second user behavior data corresponding to the second user identifier; and performing data analysis on the obtained first and second user behavior data based on the stored association relationship between the first user identifier and the second user identifier.

According to an aspect of an exemplary embodiment, there is provided a system for identifying user information, including at least one processor to implement: an identifier obtaining unit configured to obtain a first user identifier of a user in a social network; an information obtaining unit configured to obtain identity authentication information corresponding to the first user identifier; a first determining unit configured to determine whether the identity authentication information is associated with a second user identifier; and a processing unit configured to, when it is determined that the identity authentication information is associated with a second user identifier, store an association relationship between the first user identifier and the second user identifier.

The processing unit may identify a record item by using the first user identifier as a keyword, and record, in the record item, the second user identifier and the identity authentication information corresponding to the first user identifier.

The system may further include a second determining unit implemented by the at least one processor, wherein the second determining unit is configured to determine whether the association relationship between the first user identifier and the second user identifier is stored in an identity information relationship database; and the processing unit is further configured to store the association relationship between the first user identifier and the second user identifier when it is determined that the association relationship between the first user identifier and the second user identifier is not stored in the identity information relationship database.

The association relationship may include a master-slave relationship between the first user identifier and the second user identifier, and the processing unit may perform at least one of: obtaining a preset rule, and determining the master-slave relationship between the first user identifier and the second user identifier based on the preset rule; and receiving indication information of the user, and determining the master-slave relationship between the first user identifier and the second user identifier based on the indication information.

The information obtaining unit may query a preset identity authentication system by using the first user identifier as a keyword, determine whether the identity authentication information corresponding to the first user identifier exists in the identity authentication system, and obtain the identity authentication information when it is determined that the identity authentication information exists in the identity authentication system.

The system may further include an establishment unit implemented by the at least one processor, wherein the establishment unit is configured to collect identity authentication information of users in the social network, and manage the identity authentication system based on the collected identity authentication information.

The system may further include a verification unit implemented by the at least one processor, wherein the verification unit is configured to verify accuracy of data mining on a user behavior based on the stored association relationship between the first user identifier and the second user identifier.

The system may further include an analysis unit implemented by the at least one processor, wherein the analysis unit is configured to obtain first user behavior data corresponding to the first user identifier and second user behavior data corresponding to the second user identifier, and perform data analysis on the obtained first and second user behavior data based on the stored association relationship between the first user identifier and the second user identifier.

According to an aspect of an exemplary embodiment, there is provided a non-transitory computer readable storage medium that stores computer readable instructions which, when executed by one or more processors, cause the one or more processors to perform: obtaining a first user identifier of a user in a social network; obtaining identity authentication information corresponding to the first user identifier; determining whether the identity authentication information is associated with a second user identifier; and storing, when the identity authentication information is associated with the second user identifier, an association relationship between the first user identifier and the second user identifier.

The storing may include identifying a record item by using the first user identifier as a keyword, and recording, in the record item, the second user identifier and the identity authentication information corresponding to the first user identifier.

The storing may include determining whether the association relationship between the first user identifier and the second user identifier is stored in an identity information relationship database; and storing the association relationship between the first user identifier and the second user identifier, when it is determined that the association relationship between the first user identifier and the second user identifier is not stored in the identity information relationship database.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

The following clearly and completely describes the technical solutions in the exemplary embodiments with reference to the accompanying drawings. Apparently, the described exemplary embodiments are merely some but not all of the embodiments. All other embodiments obtained by a person skilled in the art based on the exemplary embodiments described herein without creative efforts shall fall within the protection scope of the disclosure.

Hereinafter, exemplary embodiments will be described in detail with reference to the accompanying drawings. In the following description, a detailed description of known functions and configurations will be omitted, when it is determined that the description unnecessarily obscures the subject matter of the disclosure. The terms described below are terms defined in consideration of the functions in the disclosure, and may vary depending on the intention of the user/operator or the customs. Therefore, the definition should be made based on the contents throughout the specification.

The exemplary embodiments provide a method and a system for identifying user information in a social network.

Figure 1A:
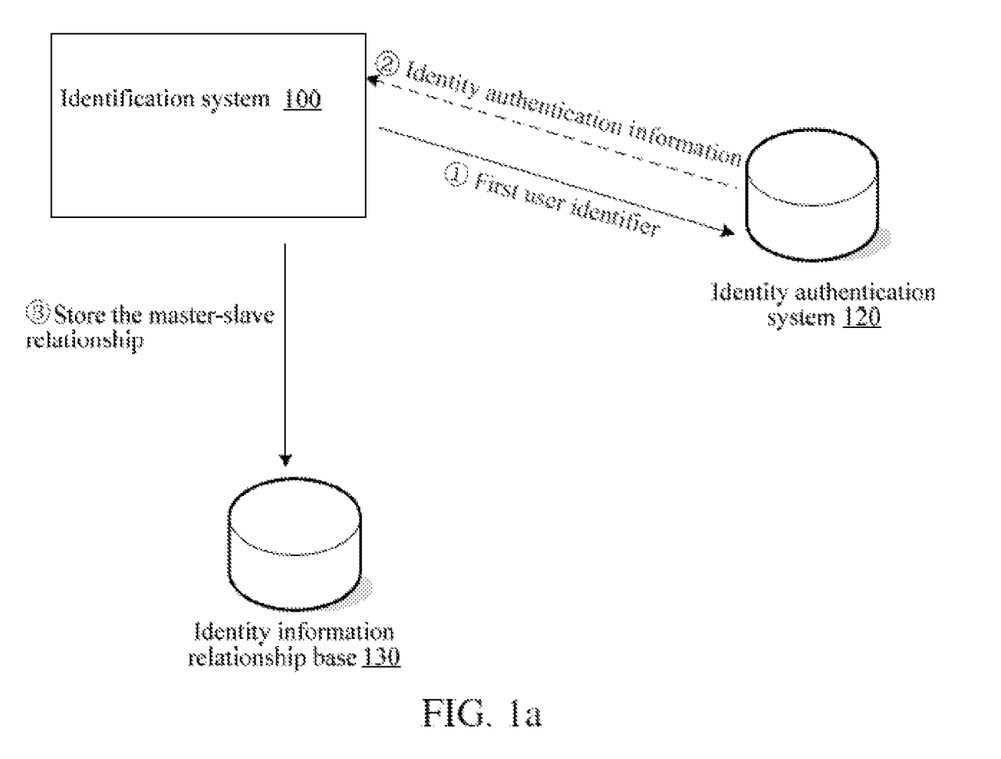
FIG. 1a is a schematic diagram illustrating operations of a system for identifying user information in a social network according to an exemplary embodiment.

FIG. 1a is a schematic diagram illustrating operations of a system for identifying user information in a social network according to an exemplary embodiment.

Referring to FIG. 1a, a system 100 for identifying user information in the social network may be provided by a server according to an exemplary embodiment. When user information of a user is to be identified, the server may obtain a first user identifier of the user in the social network, and obtain corresponding identity authentication information according to the first user identifier. For example, the server may obtain the corresponding identity authentication information from an identity authentication system 120, determine whether the identity authentication information is associated with another user identifier such as a second user identifier, and when the identity authentication information is associated with the second user identifier, establish an association relationship (e.g., a master-slave relationship) between the first user identifier and the second user identifier. Also, the server may store the association relationship, for example, the master-slave relationship in an identity information relationship base (or identity information relationship database) 130. When the identity authentication information is not associated with any second user identifier, the server may proceed to identify identity information of another user.

The identity authentication system 120 may be, for example but not limited to, a real-name information registration system, a real-name authentication system, an identity card inquiry system, a credit inquiry system, or the like. The identity authentication system 120 may be used as a subsystem of the system 100 for identifying user information in the social network, or may be independent of the system 100 for identifying user information in the social network. The identity authentication system 120 may be integrated, together with the system 100 for identifying user information in the social network, into a same entity, or may be located in an entity different from an entity in which the system 100 for identifying user information in the social network is located. Similarly, the identity information relationship base 130 may be integrated, together with the system 100 for identifying user information in the social network, into a same entity, or may be located in an entity different from an entity in which the system 100 for identifying user information in the social network is located, for example, stored in another memory. Details thereof will be omitted for brevity of explanation.

The solution according to an exemplary embodiment may be used for identification and mining of user information, or may be used as a supplement to the existing identification and mining solution.

Herein, a description is provided from the perspective of a system for identifying user information in a social network according to an exemplary embodiment. The system for identifying user information in the social network may be specifically integrated into a device such as a server.

An identification method for user information in the social network according to an exemplary embodiment includes: determining a user whose user information is to be identified; obtaining a first user identifier of the user in the social network; obtaining corresponding identity authentication information according to the first user identifier; determining whether the identity authentication information is associated with a second user identifier; and establishing, when the identity authentication information is associated with a second user identifier, an association relationship (e.g., a master-slave relationship) between the first user identifier and the second user identifier, and storing the association relationship.

Hereinafter, for illustrative purposes, exemplary embodiments in which the association relationship corresponds to a master-slave relationship between the first user identifier and the second user identifier are described. However, exemplary embodiments are not limited thereto. For example, the first user identifier and the second user identifier may be equally used as a primary identifier of the user.

Figure 1B:
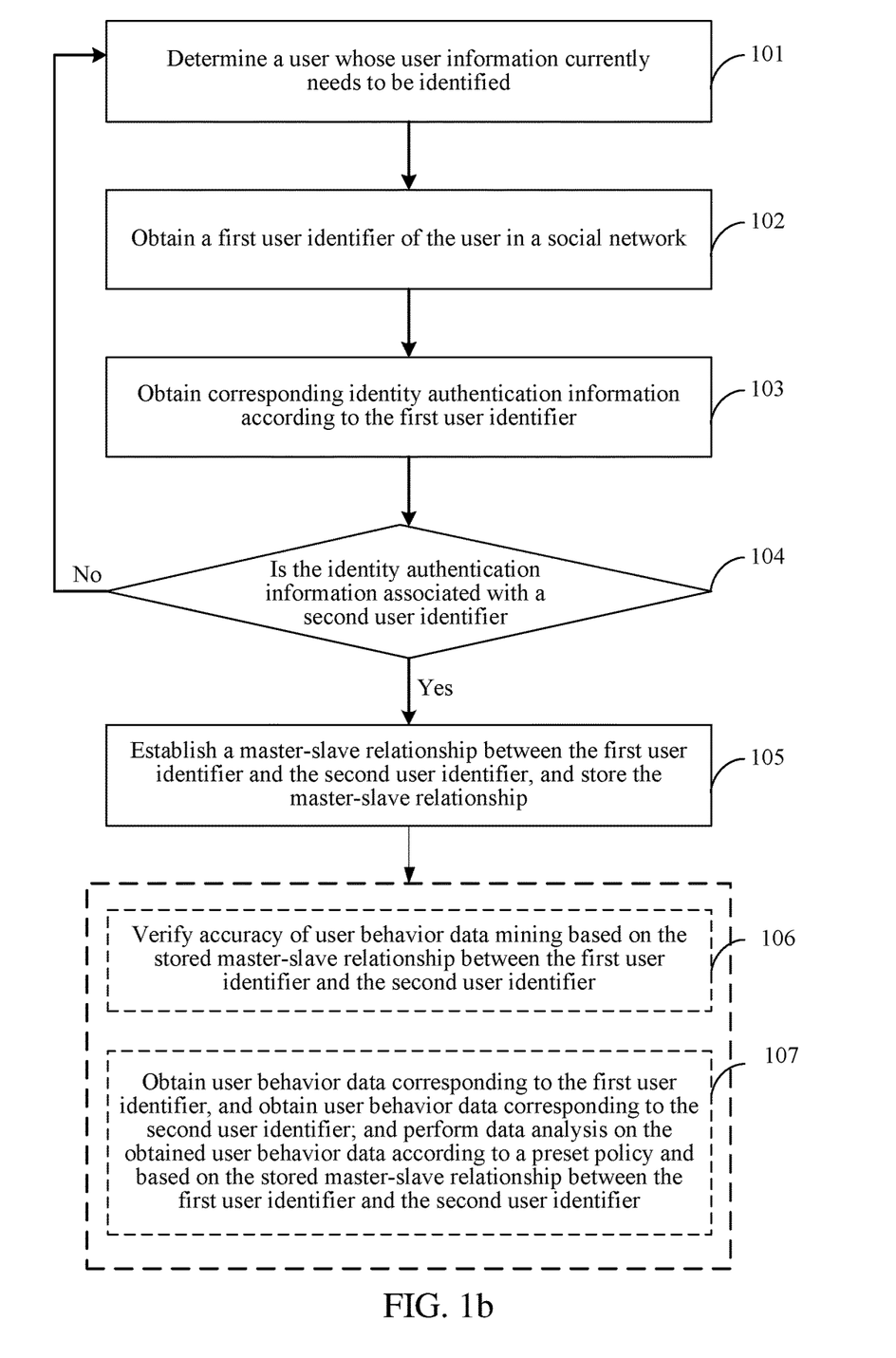
FIG. 1b is a flowchart of a method for identifying user information in a social network according to an exemplary embodiment.

FIG. 1b is a flowchart of a method for identifying user information in a social network according to an exemplary embodiment.

Referring to FIG. 1b, operations of a method for identifying user information in the social network are described.

In operation 101, a user whose user information is to be identified is determined.

For example, the user whose user information is to be identified may be determined by means of polling.

In operation 102, a user identifier of the user in the social network is obtained. For convenience of description, in an exemplary embodiment, the user identifier may be referred to as a first user identifier.

The first user identifier may include, for example but not limited to, an instant messaging account, an email account, a WeChat account, an account of another terminal application or social network, and the like.

In operation 103, corresponding identity authentication information of the user according to the first user identifier is obtained. For example, the identity authentication information may include a real name, an identity card number, a passport number, a bank account number, and/or any other information that can reflect a real identity of the user.

For example, a preset identity authentication system may be queried by using the first user identifier as a keyword. Whether the identity authentication information corresponding to the first user identifier exists in the identity authentication system is determined. When the identity authentication information exists in the identity authentication system, identity authentication information is obtained. When the identity authentication information does not exist in the identity authentication system, the process returns to operation of determining a user whose user information is to be identified, that is, return to operation 101.

A correspondence between the user identifier (including the first user identifier and/or a second user identifier) and the identity authentication information is stored in the identity authentication system. For example, the identity authentication system may be a real-name information registration system, a real-name authentication system, an identity card inquiry system, and/or a credit inquiry system. Information in the identity authentication system may be registered and input by the user, or may be input by a maintenance engineer, or may be established and updated by the system.

According to an exemplary embodiment, prior to querying a preset identity authentication system by using the first user identifier as a keyword, the identification method for user information in the social network may further include collecting identity authentication information of users in the social network, and establishing or updating the identity authentication system based on the collected identity authentication information.

Various methods for collecting the identity authentication information may be used. For example, a corresponding input interface may be provided to allow the user to input the identity authentication information. Alternatively, the identity authentication information may be extracted from some other data. For example, identification may be performed by using an identity card or a scanned copy of a certificate (e.g., an identity card or a certificate issued by an authentication agency). Details thereof will be omitted.

It should be noted that the identity authentication system according to an exemplary embodiment may be used as a subsystem of the system for identifying user information in the social network, or may be independent of the system for identifying user information in the social network. Also, the identity authentication system according to an exemplary embodiment may be integrated, together with the system for identifying user information in the social network, into a same entity, or may be located in an entity different from an entity in which the system for identifying user information in the social network is located.

In operation 104, whether the identity authentication information is associated with a second user identifier is determined, and when the identity authentication information is not associated with any second user identifier, the process returns to operation of determining a user whose user information is to be identified, that is, returns to operation 101; or if. When the identity authentication information is associated with a second user identifier, the process proceeds to operation 105.

It should be noted that the second user identifier in an exemplary embodiment may include one user identifier or may include a plurality of user identifiers. That is, the second user identifier in an exemplary embodiment refers to a user identifier associated with the identity authentication information other than the first user identifier. There may be one or more second user identifiers that are associated with the identity authentication information according to the first user identifier.

In operation 105, when it is determined that the identity authentication information is associated with a second user identifier, a master-slave relationship between the first user identifier and the second user identifier may be determined and stored.

For example, a preset rule may be obtained, and the master-slave relationship between the first user identifier and the second user identifier is determined based on the preset rule. In another example, indication information of the user may be received, and the master-slave relationship between the first user identifier and the second user identifier is determined based on the indication information.

The determining a master-slave relationship between the first user identifier and the second user identifier means that one of the first user identifier and the second user identifier is used as a master user identifier, and the other user identifier is used a slave user identifier. For example, the first user identifier may be used as the master user identifier, and the second user identifier is used as the slave user identifier. Alternatively, the second user identifier may be used as the master user identifier, and the first user identifier is used as the slave user identifier.

In some exemplary embodiments, the establishing a master-slave relationship between the first user identifier and the second user identifier may include identifying a record item by using the first user identifier as the keyword, and recording, in the record item, the second user identifier and the identity authentication information that corresponds to the first user identifier.

The preset rule may be set according to requirements of actual applications. Details thereof will be omitted.

In some exemplary embodiments, to simplify the process, before the establishing a master-slave relationship between the first user identifier and the second user identifier, it may also be first determined whether the master-slave relationship between the first user identifier and the second user identifier is stored. When the master-slave relationship between the first user identifier and the second user identifier is stored, the master-slave relationship does not need to be newly established. When the master-slave relationship between the first user identifier and the second user identifier is not stored, operation of determining a master-slave relationship between the first user identifier and the second user identifier is performed.

In other words, the method for identifying user information in the social network may further include determining whether the master-slave relationship between the first user identifier and the second user identifier is stored in the identity information relationship base; when the master-slave relationship between the first user identifier and the second user identifier is stored in the identity information relationship base, returning to operation of determining a user whose user information is to be identified, that is, returning to operation 101; and when the master-slave relationship between the first user identifier and the second user identifier is not stored in the identity information relationship base, performing the operation of establishing a master-slave relationship between the first user identifier and the second user identifier, that is, performing operation 105.

For example, the master-slave relationship may be stored in the identity information relationship base. The identity information relationship base may be integrated, together with the system for identifying user information in the social network, into a same entity, or may be located in an entity different from an entity in which the system for identifying user information in the social network is located, for example, stored in another memory. Details thereof will be omitted.

In some exemplary embodiments, after the establishing a master-slave relationship between the first user identifier and the second user identifier, the master-slave relationship may also be used to verify the accuracy of user behavior data mining, or the master-slave relationship may be used to perform analysis and mining on data according to requirements of various services, or the like.

After performing operation 105 of establishing a master-slave relationship between the first user identifier and the second user identifier, and storing the master-slave relationship, the identification method for user information in the social network may further perform operation 106 as described below.

In operation 106, accuracy of user behavior data mining is verified based on the stored master-slave relationship between the first user identifier and the second user identifier.

For example, the master-slave relationship between the first user identifier and the second user identifier may be estimated by means of the user behavior data mining, and the master-slave relationship that is obtained by means of estimation is verified by using the stored master-slave relationship. In this way, it can be learned whether the user behavior data mining is accurate, and the like.

In addition, in some exemplary embodiments, after operation 105 of establishing a master-slave relationship between the first user identifier and the second user identifier, and storing the master-slave relationship, the identification method for user information in the social network may further perform operation 107 as described below.

In operation 107, user behavior data corresponding to the first user identifier and user behavior data corresponding to the second user identifier are obtained, and data analysis is performed on the obtained user behavior data according to a preset policy and based on the stored master-slave relationship between the first user identifier and the second user identifier.

The preset policy may be determined according to requirements of actual applications such as requirements of different services. Details thereof will be omitted.

As described above, according to exemplary embodiments, a first user identifier of a user in a social network may be obtained, and corresponding identity authentication information may be obtained according to the first user identifier. Next, another user identifier, for example, a second user identifier, associated with the identity authentication information according to the first user identifier may be obtained, and a master-slave relationship between the first user identifier and the second user identifier may be established and stored, to identify all user identifiers belonging to the user in the social network and centrally manage the user identifiers. The conventional methods have problems in that data analysis and data mining can be performed only with respect to user behavior data and therefore accuracy in user information identification is lowered. On the other hand, according to exemplary embodiments, user information identification is performed while excessive algorithms are not required, and therefore, consumption of resources can be reduced and the identification efficiency can be improved. In addition, because the identity authentication information of the user is mainly used as reference during identification, the accuracy of user information identification can also be improved.

In another exemplary embodiment, descriptions are provided by using an example in which the system for identifying user information in the social network is integrated into a server and the user identifier is an instant messaging account.

Figure 2:
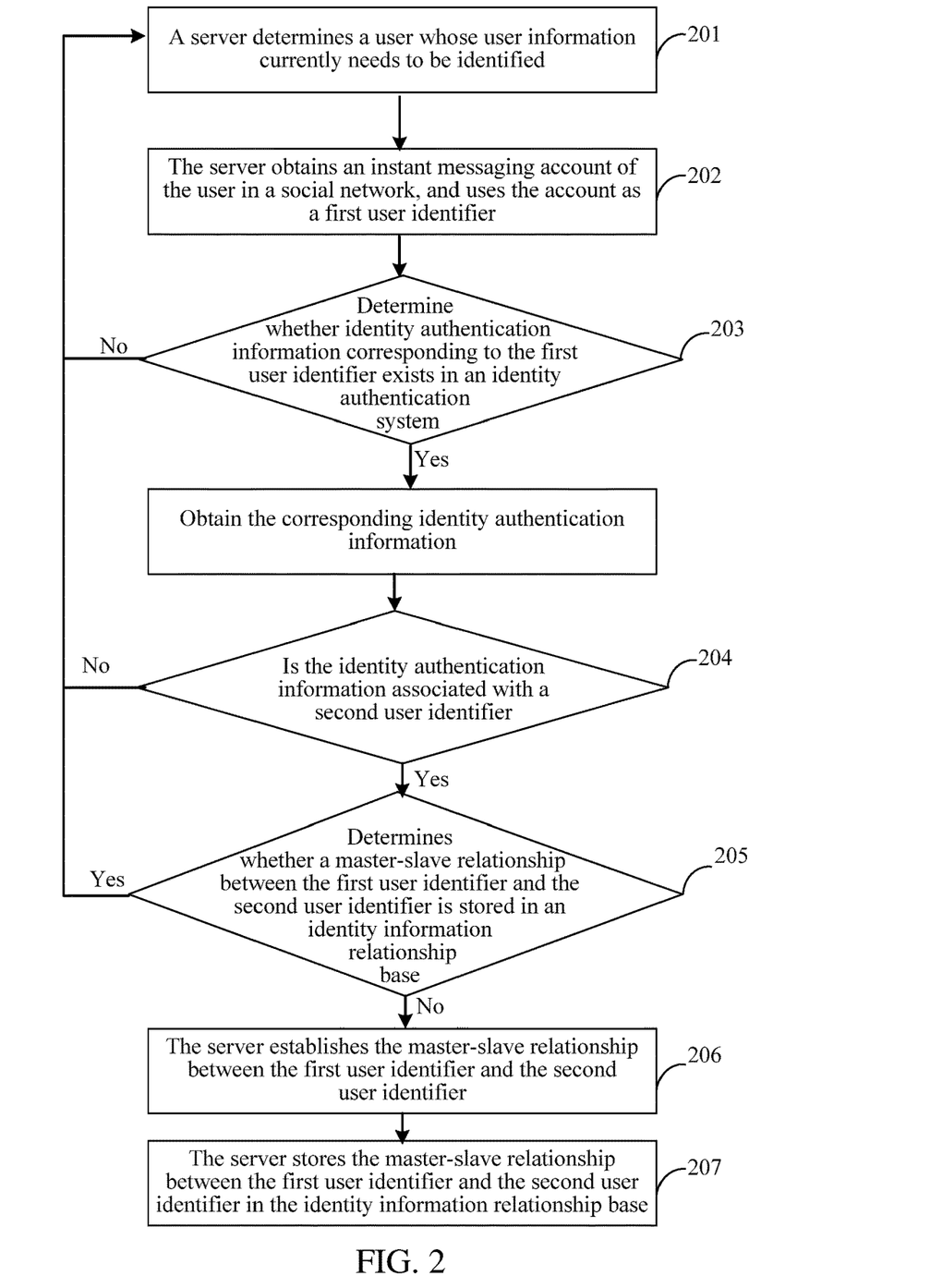
FIG. 2 is a flowchart of a method for user information in a social network according to another exemplary embodiment.

FIG. 2 is a flowchart of a method for user information in a social network according to another exemplary embodiment.

Referring to FIG. 2, a process of an identification method for user information in a social network is described.

In operation 201, a server determines a user whose user information is to be identified.

For example, the server may determine, by means of polling, the user whose user information is to be identified. For example, the server may determine that the user whose user information is to be identified is a user "Zhang San."

In operation 202, the server obtains an instant messaging account of the user in a social network, and uses the account as a first user identifier.

For example, the instant messaging account of "Zhang San" in the social network is 10001. In this case, the server may obtain the instant messaging account "10001", and use the account as the first user identifier.

In operation 203, the server queries a preset identity authentication system by using the first user identifier (that is, the instant messaging account "10001") as a keyword, determines whether identity authentication information corresponding to the first user identifier exists in the identity authentication system, and when the identity authentication information exists in the identity authentication system, obtains the corresponding identity authentication information, and proceeds to perform operation 204. When the identity authentication information does not exist in the identity authentication system, the process returns to the operation of determining a user whose user information is to be identified, that is, returns to operation 201.

Using the instant messaging account "10001" as an example, in this case, the server may query the preset identity authentication system, to determine whether identity authentication information, such as a real name, an identity card number, a passport number, a bank account number, and/or information that can reflect a real identity of the user, corresponding to the instant messaging account "10001" exists in the identity authentication system. When the identity authentication information exists in the identity authentication system, the server obtains the corresponding identity authentication information. When the identity authentication information does not exist in the identity authentication system, the server returns to operation 201.

A correspondence between the instant messaging account and the identity authentication information is stored in the identity authentication system. For example, the identity authentication system may be a real-name information registration system, a real-name authentication system, an identity card inquiry system, and/or a credit inquiry system. Information in the identity authentication system may be registered and input by the user, or may be input by a maintenance engineer, or may be established and updated by the system. For example, the server may collect identity authentication information of users in the social network to which the instant messaging account belongs, and establish or update the identity authentication system based on the collected identity authentication information.

Various methods may be used to collect the identity authentication information. For example, a corresponding input interface may be provided to allow the user to input the identity authentication information. Alternatively, the identity authentication information may be extracted from some other data. For example, identification is performed by using an identity card or a scanned copy of another certificate. Details thereof will be omitted.

It should be noted that, the identity authentication system may be used as a subsystem of the system for identifying user information in the social network, or may be independent of the system for identifying user information in the social network, or may be integrated, together with the system for identifying user information in the social network, into a same entity, for example, in the server, may be located in an entity different from an entity in which the system for identifying user information in the social network is located, for example, stored in a memory, or the like. Details thereof will be omitted.

204. The server determines whether the identity authentication information is associated with another instant messaging account, and when the identity authentication information is not associated with another instant messaging account, returns to operation of determining a user whose user information is to be identified, that is, returns to operation 201. When the identity authentication information is associated with another instant messaging account, the associated instant messaging account is obtained as a second user identifier, and the process proceeds to perform operation 205.

A quantity of the other instant messaging accounts (e.g., the second user identifiers) may be one or more.

For example, the identity authentication information may include a real name "Zhang Hao" of the user "Zhang San" and the identity card number "440307190001010001" of the user "Zhang San." In this case, the server may determine, by querying the identity authentication system, whether another instant messaging account associated with "Zhang Hao" and/or the identity card number "440307190001010001" exists in the identity authentication system. When the another instant messaging account does not exist in the identity authentication system, the server returns to operation 201. When the another instant messaging account exists in the identity authentication system, for example, it is found that "440307190001010001" is associated with an instant messaging account "20001", and "Zhang Hao" and "440307190001010001" are associated with an instant messaging account "30001", the server may obtain the two instant messaging accounts "20001" and "30001", use the two instant messaging accounts as second user identifiers, and proceed to perform operation 205.

In operation 205, the server determines whether a master-slave relationship between the first user identifier and the second user identifier is stored in the identity information relationship base, and when the master-slave relationship between the first user identifier and the second user identifier is stored, the server returns to perform operation of determining a user whose user information is to be identified, that is, returns to operation 201. When the master-slave relationship between the first user identifier and the second user identifier is not stored, the server proceeds to perform operation 206.

The identity information relationship base is mainly used to store relationships between instant messaging accounts. The identity information relationship base may be integrated, together with the system for identifying user information in the social network, into a same entity, or may be located in an entity different from an entity in which the system for identifying user information in the social network is located, for example, stored in another memory. Details thereof will be omitted.

In operation 206, the server may establish the master-slave relationship between the first user identifier and the second user identifier.

For example, the server may obtain a preset rule, and determine the master-slave relationship between the first user identifier and the second user identifier based on the preset rule. Alternatively the server may receive indication information of the user, and determine the master-slave relationship between the first user identifier and the second user identifier based on the indication information.

Still using the instant messaging account of "Zhang San" as an example, in this case, the instant messaging account "10001" of "Zhang San" may be used as a primary account of the user ""Zhang San" in the instant messaging tool, and the instant messaging accounts "20001" and "30001" may be used as secondary accounts of "Zhang San" in the instant messaging tool. Alternatively, either of "20001" and "30001" may be used as a primary account, and the other account may be used as a secondary account, or the like. Details thereof will be omitted.

In operation 207, the server stores the master-slave relationship between the first user identifier and the second user identifier in the identity information relationship base.

For example, a record item is identified by using "Zhang San" as the keyword in the identity information relationship base 120, the identity authentication information such as the real name and the identity card number that corresponds to "Zhang San" and the several instant messaging accounts belonging to or associated with "Zhang San" are input in the record item. It may be indicated that the primary account of "Zhang San" is "10001", and the secondary accounts of "Zhang San" are "20001" and "30001".

In some exemplary embodiments, subsequently, the master-slave relationship may also be used to verify accuracy of user behavior data mining, or the master-slave relationship may be used to perform analysis and mining on data according to requirements of different services, or the like.

For example, the master-slave relationship between the first user identifier and the second user identifier may be estimated by means of the user behavior data mining, and the master-slave relationship that is obtained by means of estimation is verified by using the stored master-slave relationship. In this way, it can be learned whether the user behavior data mining is accurate, and the like.

For another example, the server may further obtain user behavior data corresponding to the first user identifier, and obtain user behavior data corresponding to the second user identifier; and perform data analysis on the obtained user behavior data according to a preset policy and based on the stored master-slave relationship between the first user identifier and the second user identifier.

The preset policy may be determined according to requirements of actual applications such as requirements of different services. Details thereof will be omitted.

As can be learned from the above, in an exemplary embodiment, an instant messaging account of a user in a social network may be obtained and used as a first user identifier. Next, corresponding identity authentication information, such as a real name and/or an identity card number, according to the first user identifier may be obtained from an identity authentication system, and another instant messaging account associated with the identity authentication information may be obtained and used as a second user identifier. Next, a master-slave relationship between the first user identifier and the second user identifier may be established when it is determined that the master-slave relationship between the first user identifier and the second user identifier does not exist in an identity information relationship base 130, and the master-slave relationship may be stored in the identity information relationship base 130, to identify all user identifiers belonging to the user in the social network and centrally manage the user identifiers. The conventional methods have problems in that data analysis and data mining can be performed only with respect to user behavior data and therefore accuracy in user information identification is lowered. On the other hand, according to exemplary embodiments, user information identification is performed while excessive algorithms are not required, and therefore, consumption of resources can be reduced, and the identification efficiency can be improved. In addition, because the identity authentication information of the user is mainly used as reference during identification, the accuracy of user information identification can also be improved.

Correspondingly, the exemplary embodiments further provide a system for identifying user information in a social network, which may be referred to as an identification system.

Figure 3A:
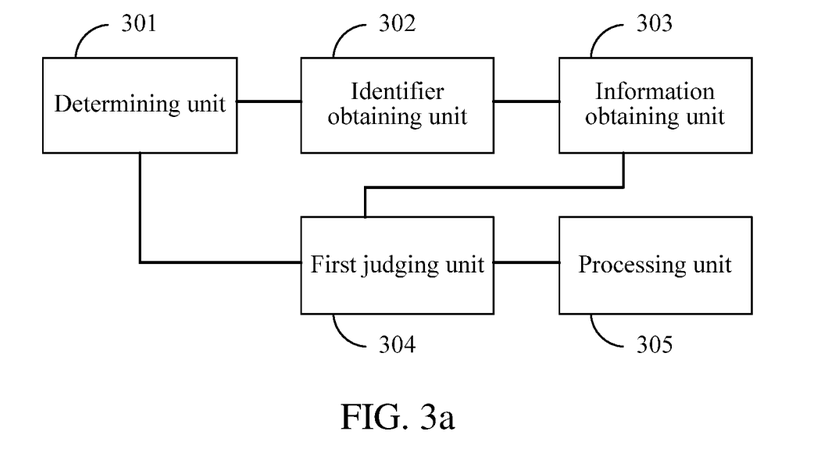
FIG. 3a is a schematic structural diagram of a system for identifying user information in a social network according to an exemplary embodiment.

FIG. 3a is a schematic structural diagram of a system for identifying user information in a social network according to an exemplary embodiment.

Referring to FIG. 3a, the identification system includes a determining unit 301, an identifier obtaining unit 302, an information obtaining unit 303, a first judging unit 304, and a processing unit 305, which are described in detail below.

(1) Determining Unit 301

The determining unit 301 is configured to determine a user whose user information is to be identified.

For example, the determining unit 301 may determine, by means of polling, the user whose user information is to be identified.

(2) Identifier Obtaining Unit 302

The identifier obtaining unit 302 is configured to obtain a first user identifier of the user in the social network.

The first user identifier may include an instant messaging account, an email account, a WeChat account, an account of another terminal application or social network, and the like.

(3) Information Obtaining Unit 303

The information obtaining unit 303 is configured to obtain corresponding identity authentication information according to the first user identifier.

The identity authentication information may include a real name of the user, an identity card number, a passport number, a bank account number, and/or information that can reflect a real identity of the user, or the like.

For example, the information obtaining unit 303 may be configured to query a preset identity authentication system by using the first user identifier as the keyword; determine whether the identity authentication information corresponding to the first user identifier exists in the identity authentication system; when the identity authentication information exists in the identity authentication system, obtain the identity authentication information; and when the identity authentication information does not exist in the identity authentication system, trigger the determining unit 301 to perform the operation of determining a user whose user information is to be identified.

A correspondence between the user identifier (including the first user identifier and/or the second user identifier) and the identity authentication information is stored in the identity authentication system. For example, the identity authentication system may be a real-name information registration system, a real-name authentication system, an identity card inquiry system, and/or a credit inquiry system. Information in the identity authentication system may be registered and input by the user, or may be input by a maintenance engineer, or may be established and updated by the system.

It should be noted that, the identity authentication system may be used as a subsystem of the identification system for user information in the social network, or may be independent of the identification system for user information in the social network, or may be integrated, together with the identification system for user information in the social network, into a same entity, or may be located in an entity different from an entity in which the identification system for user information in the social network is located.

(4) First Judging Unit 304

The first judging unit 304 is configured to determine whether the identity authentication information is associated with a second user identifier, and when the identity authentication information is not associated with any second user identifier, trigger the determining unit 301 to perform the operation of determining a user whose user information is to be identified.

(5) Processing Unit 305

The processing unit 305 is configured to, when the first judging unit 304 determines that the identity authentication information is associated with a second user identifier, establish a master-slave relationship between the first user identifier and the second user identifier, and store the master-slave relationship.

For example, the processing unit 305 may be configured to obtain a preset rule, and determine the master-slave relationship between the first user identifier and the second user identifier based on the preset rule.

Alternatively, the processing unit 305 may be configured to receive indication information of the user, and determine the master-slave relationship between the first user identifier and the second user identifier based on the indication information.

The determining a master-slave relationship between the first user identifier and the second user identifier means that one of the first user identifier and the second user identifier is used as a master user identifier, and the other user identifier is used a slave user identifier. For example, the first user identifier may be used as the master user identifier, and the second user identifier is used as the slave user identifier. Alternatively, the second user identifier may be used as the master user identifier, and the first user identifier is used as the slave user identifier.

The preset rule may be set according to requirements of actual applications. Details thereof will be omitted.

Figure 3B:
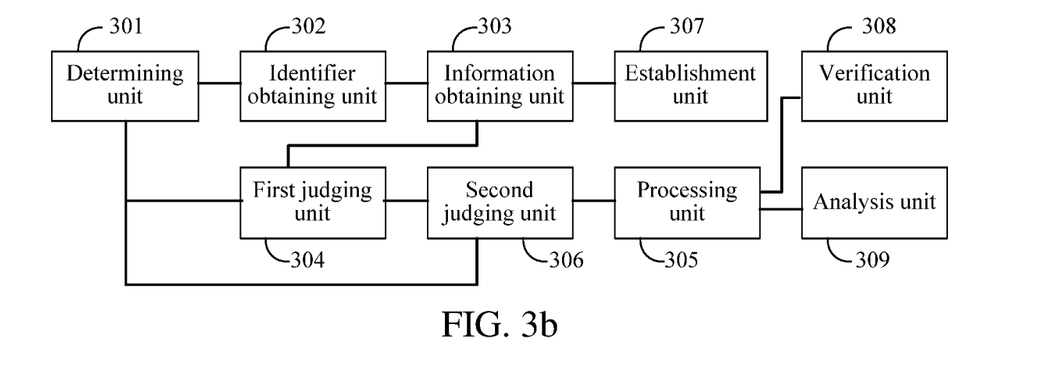
FIG. 3b is a schematic structural diagram of a system for identifying user information in a social network according to another exemplary embodiment.

FIG. 3b is a schematic structural diagram of a system for identifying user information in a social network according to another exemplary embodiment.

As shown in FIG. 3b, the identification system may further include an establishment unit 307, a second determining unit 306, a verification unit 308, and an analysis unit 309, compared with the exemplary embodiment of FIG. 3a. Descriptions of the same or similar elements will be omitted.

(6) Establishment Unit 307

The establishment unit 307 may be configured to collect identity authentication information of users in the social network, and establish or update the identity authentication system based on the collected identity authentication information. Various methods can be used to collect the identity authentication information. For example, a corresponding input interface may be provided to allow the user to input the identity authentication information. Alternatively, the identity authentication information may be extracted from some other data. For example, identification is performed by using an identity card or a scanned copy of another certificate. Details thereof will be omitted.

(6) Second Determining Unit 306

In some exemplary embodiments, to simplify the process, before the establishing a master-slave relationship between the first user identifier and the second user identifier, it may also be first determined whether the master-slave relationship between the first user identifier and the second user identifier is stored. When the master-slave relationship between the first user identifier and the second user identifier is stored, the master-slave relationship between the first user identifier and the second user identifier does not need to be newly established. When the master-slave relationship between the first user identifier and the second user identifier is not stored, the operation of establishing a master-slave relationship between the first user identifier and the second user identifier is performed. To this end, as shown in FIG. 3b, the identification system may further include the second judging unit 306.

The second judging unit 306 may be configured to determine whether the master-slave relationship between the first user identifier and the second user identifier is stored in an identity information relationship base; and when the master-slave relationship between the first user identifier and the second user identifier is stored in the identity information relationship base, trigger the determining unit 301 to perform the operation of determining a user whose user information is to be identified.

In this case, the processing unit 305 may be configured to when the first judging unit 304 determines that the identity authentication information is associated with a second user identifier, and the second judging unit 306 determines that the master-slave relationship between the first user identifier and the second user identifier is not stored in the identity information relationship base, establish the master-slave relationship between the first user identifier and the second user identifier, and store the master-slave relationship in the identity information relationship base.

The identity information relationship base may be integrated, together with the identification system for user information in the social network, into a same entity, or may be located in an entity different from an entity in which the identification system for user information in the social network is located, for example, stored in another memory. Details thereof will be omitted.

(7) Verification Unit 308

In some exemplary embodiments, after the establishing a master-slave relationship between the first user identifier and the second user identifier, the master-slave relationship may also be used to verify accuracy of user behavior data mining.

To this end, as shown in FIG. 3b, the identification system may further include the verification unit 308.

The verification unit 308 may be configured to verify accuracy of user behavior data mining based on the stored master-slave relationship between the first user identifier and the second user identifier.

For example, the master-slave relationship between the first user identifier and the second user identifier may be estimated by means of the user behavior data mining, and the master-slave relationship that is obtained by means of estimation is verified by using the stored master-slave relationship. In this way, it can be learned whether the user behavior data mining is accurate, and the like.

(8) Analysis Unit 309

In some exemplary embodiments, the master-slave relationship may also be used to perform analysis and mining on data according to requirements of various services, and the like. To this end, as shown in FIG. 3b, the identification system may further include the analysis unit 309.

The analysis unit 309 may be configured to obtain user behavior data corresponding to the first user identifier, obtain user behavior data corresponding to the second user identifier, and perform data analysis on the obtained user behavior data according to a preset policy and based on the stored master-slave relationship between the first user identifier and the second user identifier.

The preset policy may be determined according to requirements of actual applications such as requirements of different services. Details thereof will be omitted.

In an exemplary embodiment, one or more of the foregoing units may be implemented as independent entities, or may be combined in any manner and implemented as a same or several entities. One or more of the foregoing units may be implemented to perform all or some of the operations of the methods described above according to exemplary embodiments. Details thereof will be omitted.

The identification system for user information in the social network may be integrated into a device such as a server.

As can be learned from the above, in an exemplary embodiment, the identifier obtaining unit 302 of the identification system may obtain a first user identifier of a user in a social network. Next, the information obtaining unit 303 may obtain corresponding identity authentication information according to the first user identifier. The processing unit 305 may obtain another user identifier, for example, a second user identifier, associated with the identity authentication information, and establishes a master-slave relationship between the first user identifier and the second user identifier, and stores the master-slave relationship. Therefore, all of user identifiers belonging to the user in the social network are identified and centrally managed. The conventional methods have problems in that data analysis and data mining can be performed only with respect to user behavior data and therefore accuracy in user information identification is lowered. On the other hand, according to exemplary embodiments, user information identification is performed while excessive algorithms are not required, and therefore, consumption of resources can be reduced, and the identification efficiency can be improved. In addition, because the identity authentication information of the user is mainly used as reference during identification, the accuracy of user information identification can also be improved.

Figure 4:
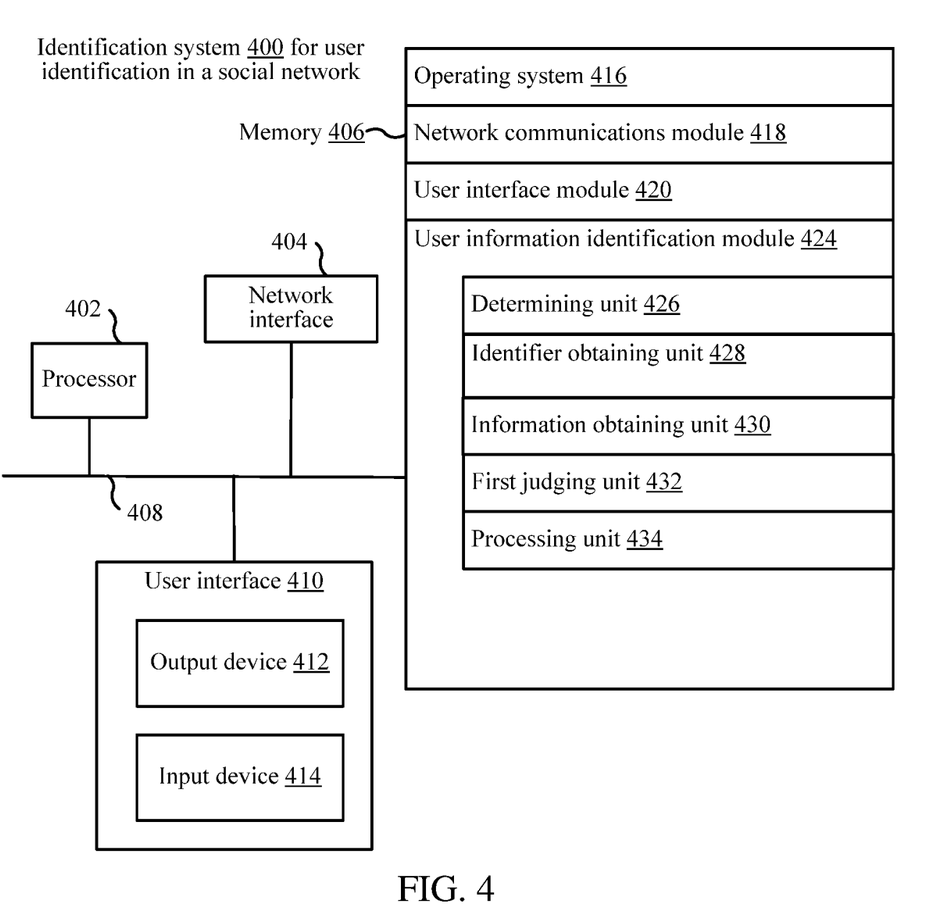
FIG. 4 is a schematic structural diagram of a system for identifying user information in a social network according to another exemplary embodiment.

FIG. 4 is a schematic structural diagram of an identification system 400 for user information in a social network according to another exemplary embodiment.

As shown in FIG. 4, the system 400 may include at least one processor 402 (for example, a central processing unit (CPU)), at least one network interface 404, a user interface 410, a memory 406, and at least one communications bus 408. The communications bus 408 is configured to implement communication connections between the components. The user interface 410 may include an input device 414 (for example, a keyboard) and an output device 412 (for example, a display), and may further include a standard wired interface and a standard wireless interface. The interface 404 may include a standard wired interface and a standard wireless interface (for example, a WiFi interface). The memory 406 may include a high speed random access memory (RAM) memory, or may include a non-volatile computer readable memory. Alternatively, the memory 406 may include at least one storage apparatus located independently from the processor 402. As a computer readable storage medium, the memory 406 may include an operating system 416, a network communications module 418, a user interface module 420, and a user information identification module 424.

The user information identification module 424 may include a determining unit 426, an identifier obtaining unit 428, an information obtaining unit 430, a first judging unit 432, and a processing unit 434.

The processor 402 may invoke the user information identification module 424 stored in the memory 406 to implement all or some of the operations of the methods according to exemplary embodiments.

A person of ordinary skill in the art may understand that, all or some of the operations of the methods in the foregoing embodiments may be implemented by a program instructing relevant hardware. The program may be stored in a computer readable storage medium. The storage medium may include a read only memory (ROM), a RAM, a magnetic disk, an optical disc, or the like.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component, such as a processor or a circuit, and/or a software component that is executed by a hardware component such as a processor.

An identification method and system for user information in a social network provided in the embodiments of the present invention are described above in detail. In this specification, specific examples are used to describe the principles and implementations. Description of the foregoing embodiments is merely intended to help understand the methods and a core idea. Meanwhile, a person skilled in the art can make variations to a specific implementation and the application scope according to the idea. In conclusion, this specification shall not be constructed as a limitation to this application.

What is claimed is:

1. A method for identifying user information, the method performed by at least one computer processor and comprising:
   obtaining a first user identifier of a user in a social network;
   obtaining identity authentication information corresponding to the first user identifier;
   determining whether the identity authentication information is associated with a second user identifier;
   storing, in response to determining that the identity authentication information is associated with the second user identifier, an association relationship between the first user identifier and the second user identifier;
   performing data mining on a user behavior, and estimating a master-slave relationship between the first user identifier and the second user identifier based on the data mining on the user behavior; and
   verifying the estimated master-slave relationship between the first user identifier and the second user identifier based on the stored association relationship, the stored association relationship comprising a master-slave relationship that is established between the first user identifier and the second user identifier.

2. The method according to claim 1, wherein the storing comprises:
   identifying a record item by using the first user identifier as a keyword, and recording, in the record item, the second user identifier and the identity authentication information corresponding to the first user identifier.

3. The method according to claim 1, wherein the storing comprises:
   determining whether the association relationship between the first user identifier and the second user identifier is stored in an identity information relationship database; and
   storing the association relationship between the first user identifier and the second user identifier, in response to determining that the association relationship between the first user identifier and the second user identifier is not stored in the identity information relationship database.

4. The method according to claim 3, wherein the storing the association relationship comprises:
   storing the association relationship in the identity information relationship database.

5. The method according to claim 1, further comprising performing at least one of:
   obtaining a preset rule, and determining the master-slave relationship between the first user identifier and the second user identifier based on the preset rule; and
   receiving indication information of the user, and determining the master-slave relationship between the first user identifier and the second user identifier based on the indication information.

6. The method according to claim 1, wherein the obtaining the identity authentication information corresponding to the first user identifier comprises:
   querying a preset identity authentication system by using the first user identifier as a keyword;
   determining whether the identity authentication information corresponding to the first user identifier exists in the preset identity authentication system; and
   obtaining the identity authentication information in response to determining that the identity authentication information exists in the preset identity authentication system.

7. The method according to claim 6, further comprising:
   collecting identity authentication information of users in the social network; and
   managing the identity authentication system based on the collected identity authentication information.

8. The method according to claim 1, further comprising:
   verifying accuracy of the data mining on the user behavior based on a result of the verifying the estimated master-slave relationship between the first user identifier and the second user identifier.

9. The method according to claim 1, further comprising:
   obtaining first user behavior data corresponding to the first user identifier and second user behavior data corresponding to the second user identifier; and
   performing data analysis on the obtained first and second user behavior data based on the stored association relationship between the first user identifier and the second user identifier.

10. A system for identifying user information, comprising:
    at least one memory operable to store program code; and
    at least one processor operable to read the program code and operate as instructed by the program code, the program code comprising:
       identifier obtaining code configured to cause the at least one processor to obtain a first user identifier of a user in a social network;
       information obtaining code configured to cause the at least one processor to obtain identity authentication information corresponding to the first user identifier;
       first determining code configured to cause the at least one processor to determine whether the identity authentication information is associated with a second user identifier;
       processing code configured to, in response to determining that the identity authentication information is associated with the second user identifier, cause the at least one processor to store an association relationship between the first user identifier and the second user identifier; and
       verification code configured to cause the at least one processor to perform data mining on a user behavior, estimate a master-slave relationship between the first user identifier and the second user identifier based on the data mining on the user behavior, and verify the estimated master-slave relationship between the first user identifier and the second user identifier based on the stored association relationship, the stored association relationship comprising a master-slave relationship that is established between the first user identifier and the second user identifier.

11. The system according to claim 10, wherein the processing code further causes the at least one processor to identify a record item by using the first user identifier as a keyword, and record, in the record item, the second user identifier and the identity authentication information corresponding to the first user identifier.

12. The system according to claim 10, wherein the program code further comprises second determining code configured to cause the at least one processor
to determine whether the association relationship between the first user identifier and the second user identifier is stored in an identity information relationship database, and
the processing code further causes the at least one processor to store the association relationship between the first user identifier and the second user identifier in response to determining that the association relationship between the first user identifier and the second user identifier is not stored in the identity information relationship database.

13. The system according to claim 10, wherein
the processing code causes the at least one processor to perform at least one of:
obtaining a preset rule, and determining the master-slave relationship between the first user identifier and the second user identifier based on the preset rule; and
receiving indication information of the user, and determining the master-slave relationship between the first user identifier and the second user identifier based on the indication information.

14. The system according to claim 10, wherein
the information obtaining code causes the at least one processor to query a preset identity authentication system by using the first user identifier as a keyword, determine whether the identity authentication information corresponding to the first user identifier exists in the identity authentication system, and obtain the identity authentication information in response to determining that the identity authentication information exists in the identity authentication system.

15. The system according to claim 14, further comprising:
establishment code configured to cause the at least one processor to collect identity authentication information of users in the social network, and manage the identity authentication system based on the collected identity authentication information.

16. The system according to claim 10, wherein the verification code causes the at least one processor to verify accuracy of the data mining on the user behavior based on a result of the verifying the estimated master-slave relationship between the first user identifier and the second user identifier.

17. The system according to claim 10, further comprising:
analysis code configured to cause the at least one processor configured to obtain first user behavior data corresponding to the first user identifier and second user behavior data corresponding to the second user identifier, and perform data analysis on the obtained first and second user behavior data based on the stored association relationship between the first user identifier and the second user identifier.

18. A non-transitory computer readable storage medium that stores computer readable instructions which, when executed by one or more processors, cause the one or more processors to perform:
obtaining a first user identifier of a user in a social network;
obtaining identity authentication information corresponding to the first user identifier;
determining whether the identity authentication information is associated with a second user identifier;
storing, in response to the identity authentication information being associated with the second user identifier, an association relationship between the first user identifier and the second user identifier;
performing data mining on a user behavior;
estimating a master-slave relationship between the first user identifier and the second user identifier based on the data mining on the user behavior; and
verifying the estimated master-slave relationship between the first user identifier and the second user identifier based on the stored association relationship, the stored association relationship comprising a master-slave relationship that is established between the first user identifier and the second user identifier.

19. The non-transitory computer readable storage medium according to claim 18, wherein the storing comprises:
identifying a record item by using the first user identifier as a keyword, and recording, in the record item, the second user identifier and the identity authentication information corresponding to the first user identifier.

20. The non-transitory computer readable storage medium according to claim 18, wherein the storing comprises:
determining whether the association relationship between the first user identifier and the second user identifier is stored in an identity information relationship database; and
storing the association relationship between the first user identifier and the second user identifier, in response to determining that the association relationship between the first user identifier and the second user identifier is not stored in the identity information relationship database.

* * * * *